(12) United States Patent
Seo

(10) Patent No.: US 8,503,083 B2
(45) Date of Patent: Aug. 6, 2013

(54) LENS SHEET FOR MICROLENS AND LENTICULAR LENS

(76) Inventor: Jeong Sik Seo, Seoul (KR)

( * ) Notice: Subject to any disclaimer, the term of this patent is extended or adjusted under 35 U.S.C. 154(b) by 49 days.

(21) Appl. No.: 13/324,412

(22) Filed: Dec. 13, 2011

(65) Prior Publication Data

US 2012/0147474 A1    Jun. 14, 2012

(30) Foreign Application Priority Data

Dec. 13, 2010    (KR) .................. 10-2010-0127190

(51) Int. Cl.
*G02B 27/10*    (2006.01)

(52) U.S. Cl.
USPC ............ 359/624; 359/619; 359/621; 359/623

(58) Field of Classification Search
USPC ............ 359/618–624; 348/E13.026–E13.043
See application file for complete search history.

(56) References Cited

U.S. PATENT DOCUMENTS

2006/0126186 A1    6/2006    Kanda et al.

FOREIGN PATENT DOCUMENTS

| DE | 10104317 A1 | 1/2001 |
|----|-------------|--------|
| KR | 20-0311905 Y1 | 5/2003 |
| KR | 20-0444099 Y1 | 4/2009 |
| KR | 100841438 B1 | 6/2009 |

OTHER PUBLICATIONS

European Search Report of Application No. EP 11192617, dated Feb. 20, 2012.

*Primary Examiner* — Mahidere Sahle
(74) *Attorney, Agent, or Firm* — Kile Park Reed & Houtteman PLLC

(57) ABSTRACT

A lens sheet for both a microlens and a lenticular lens includes a first lenticular lens layer having semicircular convex lenses which are arranged in parallel; a refraction control adhesive layer formed under the first lenticular lens layer; a second lenticular lens layer formed under the refraction control adhesive layer and having semicircular convex lenses which are arranged in parallel; a focal distance layer formed under the second lenticular lens layer; and a three-dimensional layer formed under the focal distance layer, wherein an extension direction of the semicircular convex lenses arranged in the first lenticular lens layer and an extension direction of the semicircular convex lenses arranged in the second lenticular lens layer are crossed with each other.

11 Claims, 3 Drawing Sheets

LENS SHEET FOR MICROLENS AND LENTICULAR LENS

BACKGROUND OF THE INVENTION

1. Field of the Invention

The present invention relates to a lens sheet, and more particularly, to a lens sheet for both a microlens and a lenticular lens.

2. Description of the Related Art

Lens sheets are used in various fields. Representatively, lens sheets are applied to a liquid crystal display, a three-dimensional display, a surface light source device, a back light unit, a lens sheet for three-dimensional look, etc.

FIG. 1 is a view illustrating the structure of a conventional microlens sheet for three-dimensional look.

Referring to FIG. 1, a conventional microlens sheet 100 for three-dimensional look includes a lens array layer 110 in which convex lenses are arranged in arrays, a focal distance layer 120 which is formed under the lens array layer 110 and defines an appropriate focal distance in correspondence to the radius of curvature of the lenses, and a three-dimensional layer 130 which is formed under the focal distance layer 120 and on which a three-dimensional image is produced by predetermined three-dimensional patterns.

In such a microlens sheet, stereoscopic depth is realized by an observer's optical illusion, and a difference in depth is determined by the size and density of three-dimensional patterns. For example, in the case where 200 convex lenses are formed at an angle of 45° per inch, the observer feels protruding image volume if the number of three-dimensional patterns is determined to be less than 200 and retreating image volume if the number of three-dimensional patterns is determined to be more than 200.

In general, in the microlens sheet 300 for three-dimensional look, the shapes of lenses are formed by fabricating a mold using a method such as lithography and laser etching. In the case where the mold is fabricated through lithography, while a microlens of high quality can be manufactured, the size of lenses is substantially limited and cost becomes high. In the case where the mold is fabricated through laser etching, while a large-sized roll mold can be fabricated at a relatively cheap cost, the quality of the mold is likely to deteriorate and it is difficult to fabricate the mold in conformity with a design.

FIG. 2 is a view illustrating the structure of a conventional lenticular lens sheet.

Referring to FIG. 2, a conventional lenticular lens sheet 200 for three-dimensional look includes a lens array layer 210 in which a plurality of semicircular convex lenses are arranged in parallel, a focal distance layer 220 which is formed under the lens array layer 210 and defines an appropriate focal distance in correspondence to the radius of curvature of the lenses, and a three-dimensional layer 230 which is formed under the focal distance layer 220 and on which a three-dimensional image is produced.

Generally, in the lenticular lens sheet 200, while a mold of high quality can be fabricated using a diamond tool and image volume can be freely rendered, the image volume is limited depending upon an observing direction, and vertigo can be caused. Also, stable three-dimensional patterns cannot be realized using moire, unlike the case of the microlens.

Problems of the conventional microlens, which is manufactured by fabricating the mold through etching, are as follows.

First, the microlens by chemical etching is difficult to have a radius of curvature conforming to a design.

Second, the transparency of a lens sheet is degraded in proportion to a depth of embossings of the mold due to characteristics of chemical etching.

Third, when repeatedly manufacturing the same lens, it is difficult to uniformly fabricate the mold for a microlens in consideration of a state of an etching solution, an external temperature and an operator's condition due to the characteristics of chemical etching.

Fourth, while simple patterns can be realized to have a stable three-dimensional shape, realization of a three-dimensional shape of a general image is limited.

Problems of the conventional lenticular lens, which is manufactured by fabricating the mold using the diamond tool, are as follows.

First, while image volume can be freely realized in realizing a three-dimensional image, the image volume can be felt not in upward and downward directions but only in leftward and rightward directions.

Second, vertigo can be visually caused due to a jumping phenomenon of an image.

Third, three-dimensional realization of various patterns using a moire method becomes impossible.

In a convex lens three-dimensional printing sheet described in Korean Utility Model Registration No. 20-0311905 and a three-dimensional printing sheet described in Korean Utility Model Registration No. 20-0444099, a three-dimensional printing pattern image is expressed using a moire including multi-colored 2D images, and the conventional microlens is adopted.

A positive lens sheet of a flat surface described in Korean Patent Application No. 10-2006-0138521 relates to a flat three-dimensional sheet in which galipot with different refractive index is applied to surfaces of lenses such that the lenses are not viewed from an outside. The conventional microlens and lenticular lens are selectively used.

While various three-dimensional lens sheets which realize three-dimensional shapes by rendering engraved or embossed fine embossing patterns in place of three-dimensional printing are disclosed in the art, these lens sheets adopt microlenses of upward, downward, leftward and rightward radiation types.

SUMMARY OF THE INVENTION

Accordingly, the present invention has been made in an effort to solve the problems occurring in the related art, and an object of the present invention is to provide a lens sheet for both a microlens and a lenticular lens, which can allow a microlens to be manufactured using a diamond tool, prevent lenses from being exposed on a surface, and simultaneously obtain three-dimensional effects of both a lenticular lens and a microlens.

In order to achieve the above object, according to one aspect of the present invention, there is provided a lens sheet for both a microlens and a lenticular lens, including: a first lenticular lens layer having semicircular convex lenses which are arranged in parallel; a refraction control adhesive layer formed under the first lenticular lens layer; a second lenticular lens layer formed under the refraction control adhesive layer and having semicircular convex lenses which are arranged in parallel; a focal distance layer formed under the second lenticular lens layer; and a three-dimensional layer formed under the focal distance layer, wherein an extension direction of the semicircular convex lenses arranged in the first lenticular lens layer and an extension direction of the semicircular convex lenses arranged in the second lenticular lens layer are crossed with each other.

Preferably, curved surfaces of the semicircular convex lenses arranged in the first lenticular lens layer face downward, and curved surfaces of the semicircular convex lenses arranged in the second lenticular lens layer face upward.

Also, the lens sheet may further include at least one of: a first resin coating layer formed over the first lenticular lens layer; a second resin coating layer formed between the first lenticular lens layer and the refraction control adhesive layer; and a third resin coating layer formed between the refraction control adhesive layer and the second lenticular lens layer.

BRIEF DESCRIPTION OF THE DRAWINGS

The above objects, and other features and advantages of the present invention will become more apparent after a reading of the following detailed description taken in conjunction with the drawings, in which.

DETAILED DESCRIPTION OF PREFERRED EMBODIMENTS

Figure 1:
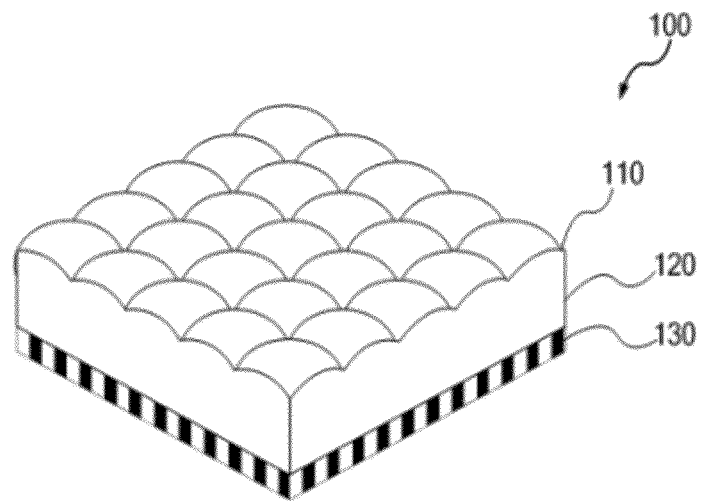
FIG. 1 is a view illustrating the structure of a conventional microlens sheet for three-dimensional look.
Figure 2:
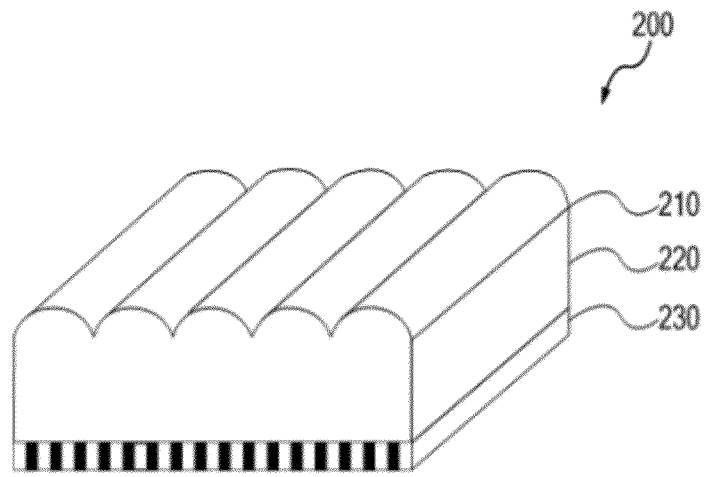
FIG. 2 is a view illustrating the structure of a conventional lenticular lens sheet.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 3:
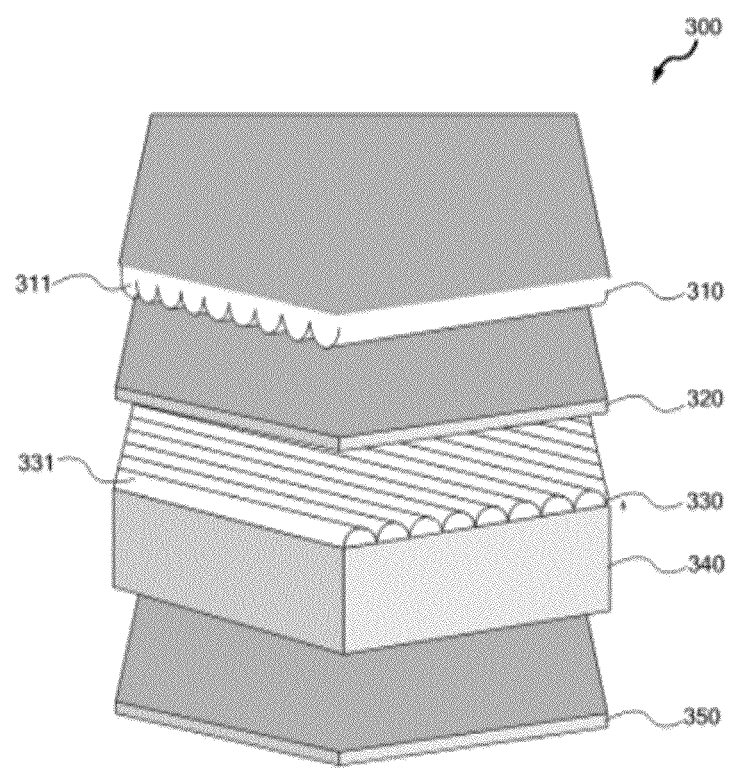
FIG. 3 is an exploded view illustrating a lens sheet for both a microlens and a lenticular lens in accordance with an embodiment of the present invention.

FIG. 3 is an exploded view illustrating a lens sheet for both a microlens and a lenticular lens in accordance with an embodiment of the present invention.

Referring to FIG. 3, a lens sheet 300 for both a microlens and a lenticular lens in accordance with an embodiment of the present invention includes a first lenticular lens layer 310 in which semicircular convex lenses 311 are arranged in parallel, a refraction control adhesive layer 320 which is formed under the first lenticular lens layer 310, a second lenticular lens layer 330 which is formed under the fraction control adhesive layer 320 and in which semicircular convex lenses 331 are arranged in parallel, a focal distance layer 340 which is formed under the second lenticular lens layer 330 and defines an appropriate focal distance in correspondence to the radius of curvature of the lenses, and a three-dimensional layer 350 which is formed under the focal distance layer 340 and on which a three-dimensional image is produced.

The extension direction of the semicircular convex lenses 311 arranged in the first lenticular lens layer 310 and the extension direction of the semicircular convex lenses 331 arranged in the second lenticular lens layer 330 are crossed with each other. Preferably, a crossing angle is set to 90° or 45°.

In the embodiment of the present invention, the first and second lenticular lens layers 310 and 330 are disposed to face each other. That is to say, the curved surfaces of the semicircular convex lenses 311, which are arranged in the first lenticular lens layer 310, face downward, and the curved surfaces of the semicircular convex lenses 331, which are arranged in the second lenticular lens layer 330, face upward. In the embodiment of the present invention, through this configuration, it is possible to manufacture a lens sheet of high quality, in which lenses are not exposed on a surface.

The first lenticular lens layer 310 is formed to a minimum thickness in such a way as not to have a focal distance layer thereunder and include only the semicircular convex lenses 311. It is preferred that the convex lenses 311 of the first lenticular lens layer 310 and the convex lenses 331 of the second lenticular lens layer 330 have the same radius of curvature, refractive index and lens pitch.

The focal distance layer 340 formed under the second lenticular lens layer 330 has properties that are calculated in consideration of the refractive index and radius of curvature of the first lenticular lens layer 310, the refractive index of the refraction control adhesive layer 320, and the refractive index and radius of curvature of the second lenticular lens layer 330.

Figure 4:
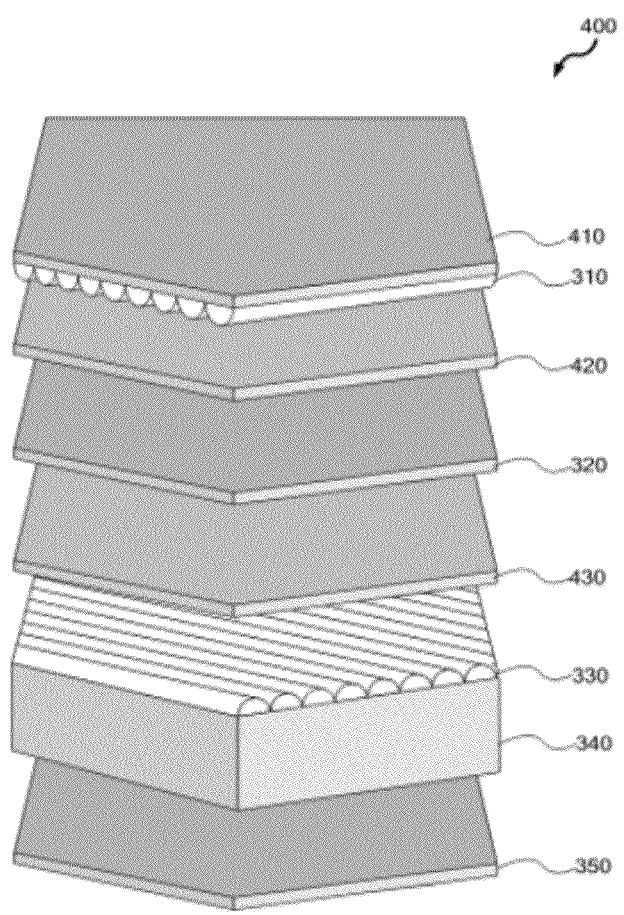
FIG. 4 is an exploded view illustrating a lens sheet for both a microlens and a lenticular lens in accordance with another embodiment of the present invention.

FIG. 4 is an exploded view illustrating a lens sheet for both a microlens and a lenticular lens in accordance with another embodiment of the present invention.

Referring to FIG. 4, a lens sheet 400 for both a microlens and a lenticular lens in accordance with another embodiment of the present invention is configured in such a manner that the lens sheet shown in FIG. 3 is additionally provided with at least one of a first resin coating layer 410 which is formed over the first lenticular lens layer 310, a second resin coating layer 420 which is formed between the first lenticular lens layer 310 and the refraction control adhesive layer 320, and a third resin coating layer 430 which is formed between the refraction control adhesive layer 320 and the second lenticular lens layer 330.

Such first through third resin coating layers 410, 420 and 430 improve the functionality of the first and second lenticular lens layers 310 and 330. For example, in the case where the lenticular lens layers 310 and 330 are formed of A-PET (A-polyethylene terephthalate), advantages are provided in terms of high transparency, high refraction, dimensional stability and low price, and disadvantages are provided in terms of adhesiveness and printability. In the case where the lenticular lens layers 310 and 330 are formed of G-PET (G-polyethylene terephthalate), advantages are provided in terms of high transparency, good adhesiveness, printability, high refraction and dimensional stability, and disadvantages are provided in terms of high price. That is to say, respective resins have advantages and disadvantages.

Accordingly, in the embodiment of the present invention, the lenticular lens layers 310 and 330 are formed of A-PET resin, and the first through third resin coating layers 410, 420 and 430 are finely coated using G-PET. As a result, the advantages of A-PET in terms of high transparency, high refraction, dimensional stability and low price and the advantages of G-PET in terms of good adhesiveness and printability can be simultaneously provided. Such a combination of resins is given as a mere example, and it is to be noted that the present invention is not limited to such a combination.

Also, it is preferred that the convex lenses 311 of the first lenticular lens layer 310 and the convex lenses 331 of the second lenticular lens layer 330 be designed in aspherical shapes.

This is because a three-dimensional lens sheet with a conventional cross-section has an angle of view depending upon a radius of curvature and lenses are classified as conversion lenses if the angle of view is equal to or larger than 45° and as three-dimensional lenses if the angle of view is less than 45°.

Nevertheless, in the case of processing the surfaces of the lenses using a coating agent with low refractive index, not single refractive index but double refractive index can be achieved, and due to this fact, a phenomenon, in which an angle of view is narrowed, occurs.

Accordingly, in the embodiment of the present invention, after forming lenses into aspherical shapes with an excessively large angle of view, the first lenticular lens layer 310 and the second lenticular lens layer 330 are integrated with each other using transparent galipot adhesive, and stable image volume can be obtained even though the angle of view is narrowed according to a refractive index formula.

The refractive index of the refraction control adhesive layer 320 as transparent galipot should be smaller than the refractive index of the first and second lenticular lens layers 310 and 330. For example, if PET of the first and second lenticular lens layers 310 and 330 has refractive index of 1.575 and the transparent galipot of the refraction control adhesive layer 320 has refractive index of 1.575, the lens sheet becomes not a three-dimensional lens sheet but a general transparent sheet. As the refractive index of the refraction control adhesive layer 320 as transparent galipot is small, the thickness of the manufactured lens sheet decreases as a matter of course.

As is apparent from the above description, the present invention provides advantages in that it is possible to manufacture a microlens using a diamond tool, and since the curved surfaces of convex lenses are arranged to face each other at different angles, it is possible to manufacture a three-dimensional sheet of a high quality in which lenses are not exposed from a surface.

Also, the present invention provides advantages in that, since the lenses are arranged in conformity with a lens design, image volume of high sharpness can be obtained.

Further, the present invention provides advantages in that three-dimensional effects of both a lenticular lens and a microlens, that is, image volume capable of being observed in any direction and image volume of images segmented by the unit of a frame, can be simultaneously obtained.

Although a preferred embodiment of the present invention has been described for illustrative purposes, those skilled in the art will appreciate that various modifications, additions and substitutions are possible, without departing from the scope and the spirit of the invention as disclosed in the accompanying claims.

What is claimed is:

1. A lens sheet for both a microlens and a lenticular lens, comprising:
   a first lenticular lens layer having semicircular convex lenses which are arranged in parallel;
   a refraction control adhesive layer formed under the first lenticular lens layer;
   a second lenticular lens layer formed under the refraction control adhesive layer and having semicircular convex lenses which are arranged in parallel;
   a focal distance layer formed under the second lenticular lens layer; and
   a three-dimensional layer formed under the focal distance layer,
   wherein an extension direction of the semicircular convex lenses arranged in the first lenticular lens layer and an extension direction of the semicircular convex lenses arranged in the second lenticular lens layer are crossed with each other.

2. The lens sheet according to claim 1, wherein curved surfaces of the semicircular convex lenses arranged in the first lenticular lens layer face downward, and curved surfaces of the semicircular convex lenses arranged in the second lenticular lens layer face upward.

3. The lens sheet according to claim 2, further comprising at least one of:
   a first resin coating layer formed over the first lenticular lens layer;
   a second resin coating layer formed between the first lenticular lens layer and the refraction control adhesive layer; and
   a third resin coating layer formed between the refraction control adhesive layer and the second lenticular lens layer.

4. The lens sheet according to claim 1, wherein the extension direction of the semicircular convex lenses arranged in the first lenticular lens layer and the extension direction of the semicircular convex lenses arranged in the second lenticular lens layer are crossed with each other at an angle of 90° or 45°.

5. The lens sheet according to claim 1, wherein the convex lenses of the first lenticular lens layer and the convex lenses of the second lenticular lens layer have the same radius of curvature, refractive index and lens pitch.

6. The lens sheet according to claim 1, wherein the convex lenses of the first lenticular lens layer and the convex lenses of the second lenticular lens layer have aspherical shapes.

7. The lens sheet according to claim 1, wherein a refractive index of the refraction control adhesive layer is lower than the refractive index of the first and second lenticular lens layers.

8. The lens sheet according to claim 2, wherein the extension direction of the semicircular convex lenses arranged in the first lenticular lens layer and the extension direction of the semicircular convex lenses arranged in the second lenticular lens layer are crossed with each other at an angle of 90° or 45°.

9. The lens sheet according to claim 2, wherein the convex lenses of the first lenticular lens layer and the convex lenses of the second lenticular lens layer have the same radius of curvature, refractive index and lens pitch.

10. The lens sheet according to claim 2, wherein the convex lenses of the first lenticular lens layer and the convex lenses of the second lenticular lens layer have aspherical shapes.

11. The lens sheet according to claim 2, wherein a refractive index of the refraction control adhesive layer is lower than the refractive index of the first and second lenticular lens layers.

* * * * *